No. 859,656. PATENTED JULY 9, 1907.
A. G. HARBAUGH & C. W. DETERING.
LOG UNLOADER.
APPLICATION FILED FEB. 12, 1907.
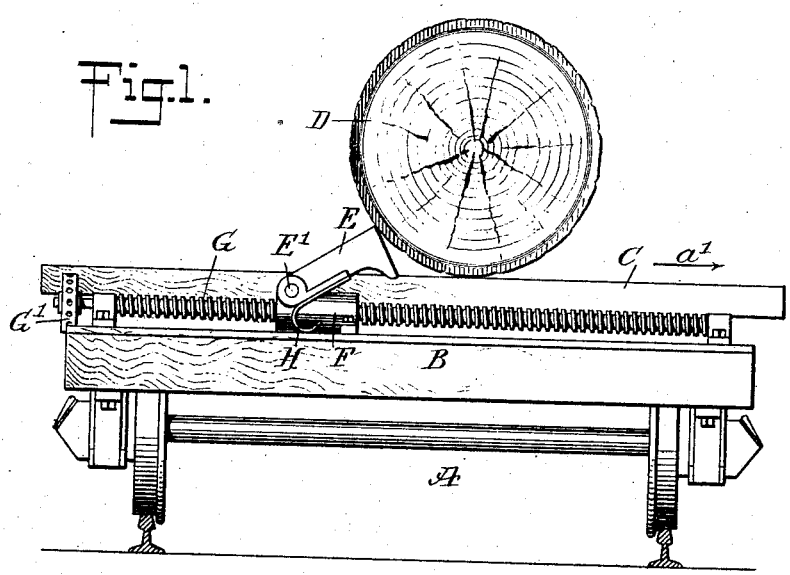
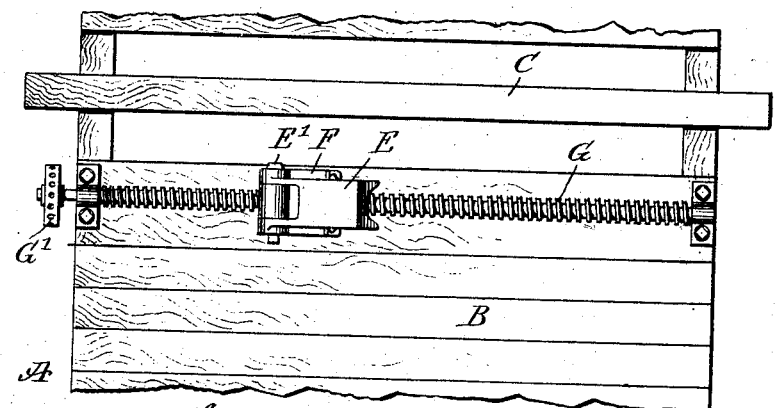
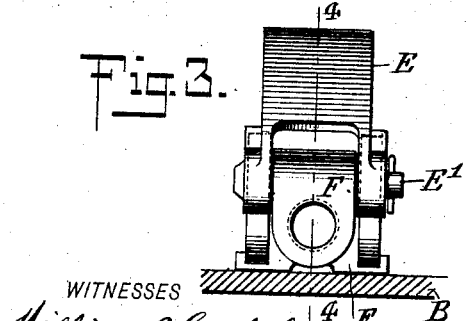
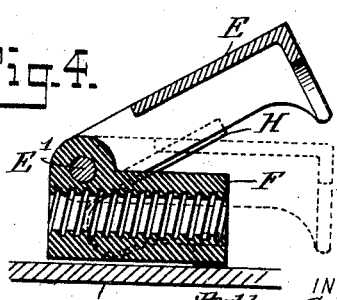
WITNESSES
INVENTORS
Arthur G. Harbaugh
Carl W. Detering
BY
ATTORNEYS

UNITED STATES PATENT OFFICE.

ARTHUR G. HARBAUGH AND CARL W. DETERING, OF SEATTLE, WASHINGTON.

LOG-UNLOADER.

No. 859,656.   Specification of Letters Patent.   Patented July 9, 1907.

Application filed February 12, 1907. Serial No. 356,948.

*To all whom it may concern:*

Be it known that we, ARTHUR G. HARBAUGH and CARL W. DETERING, both citizens of the United States, and residents of Seattle, in the county of King and State of Washington, have invented a new and Improved Log-Unloader, of which the following is a full, clear, and exact description.

The object of the invention is to provide a new and improved log unloader, which is simple and durable in construction and arranged to form a permanent fixture of the log-carrying car, and to allow convenient and quick rolling or pushing off of the log from the car, without danger to the operator.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is an end elevation of a car provided with the unloader; Fig. 2 is a plan view of the same; Fig. 3 is an enlarged end elevation of the pusher and the nut carrying the pusher, and Fig. 4 is a sectional elevation of the same, on the line 4—4 of Fig. 3.

The log-carrying car A is provided with a platform B and a transversely extending beam or support C for the logs D to rest on, the said support C being raised above the platform B, as plainly indicated in Fig. 1. The log D to be rolled or pushed off the support C is adapted to be engaged at one side near the bottom thereof by the free end of a pusher E fulcrumed at E' on a transversely movable member F, in the present instance a nut screwing on a screw rod G journaled in suitable bearings arranged on the car A and extending in a transverse direction thereof, as plainly indicated in the drawings. One outer end of the screw rod G is adapted to be turned by an operator applying a crank arm or a similar tool on the outer end of the screw rod, or the latter may be provided with a collar G' having apertures in its peripheral face for engagement by a hand lever, to allow an operator to conveniently turn the screw rod G in either a forward or a backward direction, so as to cause the nut F to travel either in the direction of the arrow $a'$ or in the inverse direction thereof. The bottom of the nut F is mounted to travel on the platform B, thus holding the nut in proper position, and the pusher E is pressed on by springs H, to hold the same normally in an inclined position, as shown in Figs. 1, 3 and 4, but to allow the pusher E to swing downward approximately into a horizontal position, as indicated in dotted lines in Fig. 4, to bring the top face of the pusher E below the face of the support C at the time the pusher E travels under a log D in the inverse direction of the arrow $a'$. Now when the several parts are in the position illustrated in Fig. 1, and the free end of the pusher E engages one side of the log D near the bottom thereof and the operator turns the screw rod G so as to cause the nut F to travel in the direction of the arrow $a'$, then the pusher E is carried bodily along by the nut F and consequently pushes the log D in a transverse direction, to push or roll the log off the support C, so that the log drops to one side of the car A. When this has been done and more logs are to be pushed off the support C, then the operator turns the screw rod G in the reverse direction, to cause the nut F and the pusher E to travel in the reverse direction of the arrow $a'$. Now when the pusher E reaches a log, it is pressed downward while passing under the log, and when its free end has passed the bottom of the log, then the spring H swings the pusher E upward, so that the free end thereof engages the side of the log near the bottom thereof, as illustrated in Fig. 1. The operator now turns the screw rod G in the forward direction, to again cause the nut F and pusher E to travel in the direction of the arrow $a'$, with a view to push the second log off the support C to one side of the car A.

From the foregoing it will be seen that the log unloader forms a permanent fixture of the car, and can be readily manipulated to engage and push the logs off the car without requiring much physical exertion on the part of the operator. It will also be noticed that the operator manipulating the device, stands on the side opposite the one on which the logs are rolled off from the car, and hence the operator is not liable to be injured. It is well known that as at present practiced, in starting to roll off the outer log of a whole load of logs the several logs frequently follow the first one too quickly for the operator to get out of the way, and consequent injury to the workman is the result.

Having thus described our invention, we claim as new and desire to secure by Letters Patent:

1. In a log unloader the combination with a car having a raised transverse support for the log, a screw-threaded rod journaled alongside the support, a nut on the rod, a pusher pivoted to the nut, a spring normally retaining the free end of the pusher elevated above the support, and means on the outer end of the rod for rotating the same.

2. In a log unloader the combination with the car of a transversely movable member arranged alongside the support, a pusher pivoted to the member, a spring normally retaining the free end of the pusher above the support, and means at the side of the car for moving said member.

3. In a log unloader, in combination with a car having a raised transversely extending support for the log, a spring-pressed pusher for engaging the log at one side thereof near the bottom, the pusher being capable of swinging down below the top face of said support, a nut on which the said pusher is fulcrumed, and a transverse screw rod journaled on the car and engaged by the said nut.

4. A log unloader for cars comprising a screw rod mounted to turn on the car and extending in a transverse direction thereof, a nut screwing on the said screw rod and mounted to travel on the car, and a spring-pressed pusher fulcrumed on the said nut and adapted to engage the log.

5. In a log unloader the combination with the car having a transverse support for the log, of a member movable alongside the support, a spring pressed pusher pivoted to the member, and means at the side of the car for moving said member.

In testimony whereof we have signed our names to this specification in the presence of two subscribing witnesses.

ARTHUR G. HARBAUGH.
CARL W. DETERING.

Witnesses:
MARTIN ROZEMA,
WM. D. TOTTEN.